(12) United States Patent  
Vlutters et al.

(10) Patent No.: US 9,131,221 B2  
(45) Date of Patent: Sep. 8, 2015

(54) STEREOSCOPIC IMAGE CAPTURING METHOD, SYSTEM AND CAMERA

(75) Inventors: Ruud Vlutters, Eindhoven (NL); Frederik Jan De Bruijn, Eindhoven (NL); Dmitry Nikolaevich Znamenskiy, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 924 days.

(21) Appl. No.: 13/379,453

(22) PCT Filed: Jun. 21, 2010

(86) PCT No.: PCT/IB2010/052801  
§ 371 (c)(1),  
(2), (4) Date: Mar. 12, 2012

(87) PCT Pub. No.: WO2010/150177  
PCT Pub. Date: Dec. 29, 2010

(65) Prior Publication Data  
US 2012/0162375 A1    Jun. 28, 2012

(30) Foreign Application Priority Data  
Jun. 25, 2009   (EP) .................... 09163727

(51) Int. Cl.  
*H04N 13/00* (2006.01)  
*H04N 13/02* (2006.01)

(52) U.S. Cl.  
CPC ....... *H04N 13/0217* (2013.01); *H04N 13/0003* (2013.01); *H04N 13/0207* (2013.01); *H04N 13/0289* (2013.01)

(58) Field of Classification Search  
CPC .......... H04N 13/0003; H04N 13/0207; H04N 13/0217; H04N 13/0289  
See application file for complete search history.

(56) References Cited

U.S. PATENT DOCUMENTS

| 5,671,089 | A | 9/1997 | Allio |
| 6,687,003 | B1 | 2/2004 | Sorensen et al. |
| 6,807,295 | B1 | 10/2004 | Ono |
| 2002/0089583 | A1* | 7/2002 | You et al. .................... 348/42 |
| 2003/0076407 | A1* | 4/2003 | Uchiyama et al. ........... 348/46 |
| 2005/0100207 | A1* | 5/2005 | Konolige .................... 382/154 |
| 2007/0285554 | A1 | 12/2007 | Givon |
| 2008/0259354 | A1 | 10/2008 | Gharib et al. |
| 2008/0316299 | A1* | 12/2008 | Porwal ........................ 348/46 |
| 2010/0007718 | A1* | 1/2010 | Rohaly et al. .............. 348/46 |

FOREIGN PATENT DOCUMENTS

| DE | 10041053 A1 | 3/2002 |
| JP | 2001016612 A | 1/2001 |
| JP | 2003004441 A | 1/2003 |
| JP | 2006154506 A | 6/2006 |

* cited by examiner

*Primary Examiner* — Sath V Perungavoor  
*Assistant Examiner* — Peter D Le

(57) ABSTRACT

A camera and camera system is provided with an optical device (8). The optical device creates simultaneously two or more images of object on a sensor (4) forming a compound image. The distance d between the constituting images of objects in the compound image is dependent on the distance Z to the camera. The compound image is analyzed (9), e.g. deconvolved to determine the distances d between the double images. These distances are then converted into a depth map (10).

12 Claims, 9 Drawing Sheets

STEREOSCOPIC IMAGE CAPTURING METHOD, SYSTEM AND CAMERA

FIELD OF THE INVENTION

The invention relates to a system for recording image data, a method for recording image data and a camera for recording image data.

BACKGROUND OF THE INVENTION

Recently there has been much interest in providing 3-D images on 3-D image displays. It is believed that 3-D imaging will be, after color imaging, the next great innovation in imaging. We are now at the advent of introduction of 3D displays for the consumer market.

A 3-D display device usually has a display screen on which the images are displayed. Basically, a three-dimensional impression can be created by using stereo images, i.e. two slightly different images directed at the two eyes of the viewer. An example of such a device is an autostereoscopic display. In other devices images are sent in all directions and glasses are used to block certain images to give a 3D perception.

Whatever type of 3-D display is used, the 3-D image information has to be provided to the display device. This is usually done in the form of a 3-D image signal comprising digital data.

The generation of 3-D images is conventionally done by adding a depth map, said depth map providing information on the depth of the pixel within the image and thus providing 3D information. Using the depth map for an image a left and right image can be constructed providing a 3D image.

Recovering 3D information from images is one of the fundamental tasks relating to 3-D imaging. The most common way of computing a depth map is to use stereovision. Although much progress has been made in stereovision, the fundamental correspondences problem remains difficult in real-world applications. In particular, the ultra precise alignment requirements between the two cameras hamper cheap consumer applications.

There have been some methods proposed to extract 3-D information from a single image. One of these methods is for instance to use the "depth from defocus" principle. In this method, a variable lens is used to sweep the focal plane through the scene, and to determine at which focus position each object is most sharply observed. However, although this may work well for a single image, for video images wherein objects are moving around this becomes very difficult. Using a variable lens while at the same time recording video images with changing content constitutes a daunting task, requiring very fast variable lenses and massive computing power. Also, it cannot be used in a known camera, if it does not have a variable lens with the required speed and scope of focus variation.

Another method is to use the so-called Time-of-Flight (ToF) principle. Light is modulated and send towards the object, and the camera measures the time delay between the send and received light. As light propagates at a fixed speed c, one can measure distances with this method. 3DV Systems, Mesa Imaging and Canesta have developed cameras based on ToF technologies. However they are generally expensive and have limited spatial resolutions (e.g., 64×64 for a Canesta sensor). They also are not, or very difficult, to apply for known cameras. At short distances it becomes, due to the short time of flight, difficult to measure anything at all. Yet other systems record, using a single camera, alternatively left and right images using shutters to shut out one of the images.

Recording alternatively left and right images works fine for static objects, but has the disadvantage that for moving objects left and right images are not the same since objects have moved between taking the images. The difference in position of an object between a left and right image is then dependent on the distance to the lens of an object, but also on the movement of the object. In order to get an accurate determination of distance, an accurate motion estimation plus stereo matching has to be performed. Both parameters, distance as well as motion, are a priori unknown and also will change in time in unknown manner. It requires several frames before accurate motion estimation is possible. In circumstances, such as moving repetitive patterns or objects moving at great speed or having an erratic motion, accurate motion estimation is hardly or at all possible.

There therefore is a need for a system based on a single camera which is possible to provide 3-D information in a relatively simple manner and could be used for existing cameras and for which the above problems are reduced.

SUMMARY OF THE INVENTION

To this end the method, system and camera of the invention is characterised in that in front of a lens and an image sensor for recording an image, an optical device for producing a compound image on the sensor comprising two or more superimposed, simultaneously taken images of a same object is provided, wherein the distance between corresponding objects on the common image sensor in the compound image is dependent on the distance of the said imaged object from the lens, and wherein the compound image is analysed to determine the spatial distance between corresponding objects in the compound image on the sensor.

The inventors have realized that by using an optical device which creates a compound image, i.e. an image comprising a left and right (or from more directions taken) image taken simultaneously it is possible to determine the distance of a recorded object to the lens, and thereby create a depth map for the recorded image. There is no need for two cameras and thus the need for accurate alignment of the cameras does not occur. The images are taken simultaneously and thus problems with shift of moving objects due to motion of the objects between the times the left and right images are taken are eliminated. Analysis of the compound image allows, e.g. by deconvolution of the compound image, to extract the two or more, simultaneously taken, constituting images of the compound image. This allows determining the distance in pixels or in cm between corresponding objects in the recorded compound image. The distance in the compound image can then be easily translated in distance to the lens, since it is only determined by this distance.

There are many optical devices that create a double image, for instance:

a grating. Gratings create, by diffraction, next to the main image side images of objects in a recording plane. The distance between an object in the main image and in the side images is directly dependent on the distance to the lens. Apart from this dependence the said distance is also dependent on the wavelength of the light. This embodiment is very useful where use is made of light of known wavelength, or of nearly monochromatic light, since this simplifies the calculations.

A birefringent plate. Birefringent plates can be used to create two images, depending on the polarization of light. There is a small angle between the two optical axes of the images, and this means that the distance between objects in a recording plane is a function of their distance from the common lens. The advantage of this type of device, compared to using a grating, is that it is not or only moderately dependent on the wavelength of light.

A prism pattern. Using a prism pattern it is possible to create two or more images of the same object that are separated by a distance. The advantage of this type of device is that it is not or only moderately dependent on the wavelength of light.

A configuration comprising a mirror and a beam-splitter to create a first view and a second view. The angle at which the two views are oriented towards the image objects differs. The advantage of this type of device is that it is not or hardly at all dependent on the wavelength of light.

A configuration of two mirrors, at least one of which has two reflecting surfaces at a distance from each other. The advantage of this type of device is that it is not or hardly at all dependent on the wavelength of light.

Basically there are two major types:

In one type, such as a grating, the light comes from a point on an object into two or more directions and hits the sensor at different positions. A single view is thereby split into two or more images wherein the distance of the images on the sensor is a measure for the distance of an object to the lens or the sensor.

In another type, such as the configuration of mirror and beam-splitter, light comes from two different positions separated by some baseline but into the same direction. Two slightly different views are recorded in the compound image on the sensor.

The latter type has the advantage, in comparison to the first type, that it is possible to see to some extent behind a foreground object, since two images of slightly different viewing point are used.

The two different types have different relations between the distance to the sensor and the distance between corresponding images on the sensor.

The common inventive concept is to create, with an optical device positioned in front of the camera, a compound image comprising two or more images of the same objects on the image sensor, wherein the two or more image of the compound image are simultaneously taken, wherein the constituting images are shifted spatially with respect to each other in the recorded compound image, wherein the spatial shift is dependent on the distance of the object to the camera.

The recorded image is then analysed to determine the distances on the sensor and the distance of the object to the camera can be calculated. This enables a depth map to be made.

In preferred embodiments the analysis is brought one step further in that one of the constituting images is reconstructed from the recorded compound image. This allows a user to see an image as he is used to see.

In short the software performs the following task:

Estimate the displacement between the two or more constituting images due to the diffraction process (for a grating) or shift (for mirror and beam splitter).

calculate a depth map based on this displacement and optionally

Reconstruct the undistorted image based on the found depth map

The reconstructed image is in embodiments shown on the display of the system or camera, the depth map may also be made visible, or, in embodiment, an image may be shown that combines the two into a single image. Alternatively, if the camera comprises a means for stereo vision a stereo image may be displayed.

In embodiments wherein video information is recorded in frames, the system and camera of the invention is in embodiments, by controlling the operation of the optical device, arranged to record a number of frames comprising a number of simple images and a number of compound images.

If a single image, i.e. non-compound, image is known, the information obtained on the simple image allows a relatively easier extracting of the constituting images from the compound image and/or a relatively reliable check on results and/or a relatively easy reconstruction of one of the constituting images. Essential to the invention is, however, that compound images are taken wherein 1. the constituting images are simultaneously taken
2. the images are recorded on the same sensor.

The first feature, i.e. the simultaneous recording of the constituting images, eliminates any problem of shift in position of objects due to motion of an object between the times the constituting images are taken.

The second feature eliminates any problem due to uncertainty in alignment of sensor or differences between sensors. Preferably the constituting images are also taken through the same lens to avoid any problems with alignment of lenses.

Preferably the constituting images differ either in intensity or in colour content, wherein the difference is relatively small. If the two images have the same content, it becomes difficult to deconvolute the compound image.

BRIEF DESCRIPTION OF THE DRAWINGS

These and further aspects of the invention will be explained in greater detail by way of example and with reference to the accompanying drawings, in which.

The figures are not drawn to scale. Generally, identical components are denoted by the same reference numerals in the figures.

DETAILED DESCRIPTION OF PREFERRED EMBODIMENTS

Figure 1:
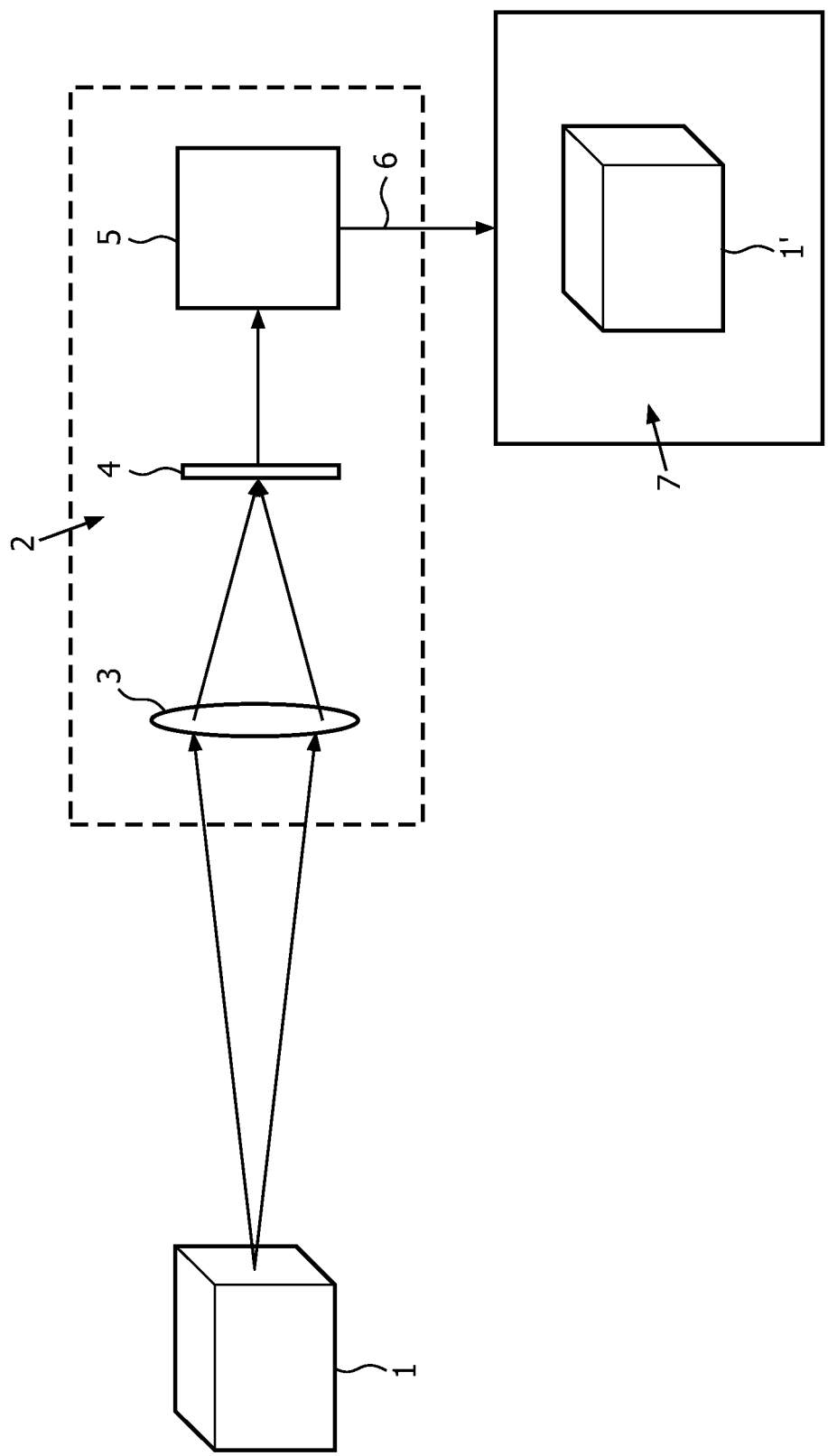
FIG. 1 illustrates a standard method for recording electronic image data.

FIG. 1 schematically illustrates a system, method and camera to record images.

The object 1 is captured by lens 3 of camera 2. The image is focused on sensor 4, for instance a CCD. This device produces a signal which is converted into signal 6 by for instances an encoder 5. The encoder 5 could do some image enhancement or otherwise improve the image signal.

The signal can be sent, either in encoded form or directly to a display device having a display 7 on which an image 1' is visible. The signal 6 can also be stored on some type of storage medium.

Figure 2:
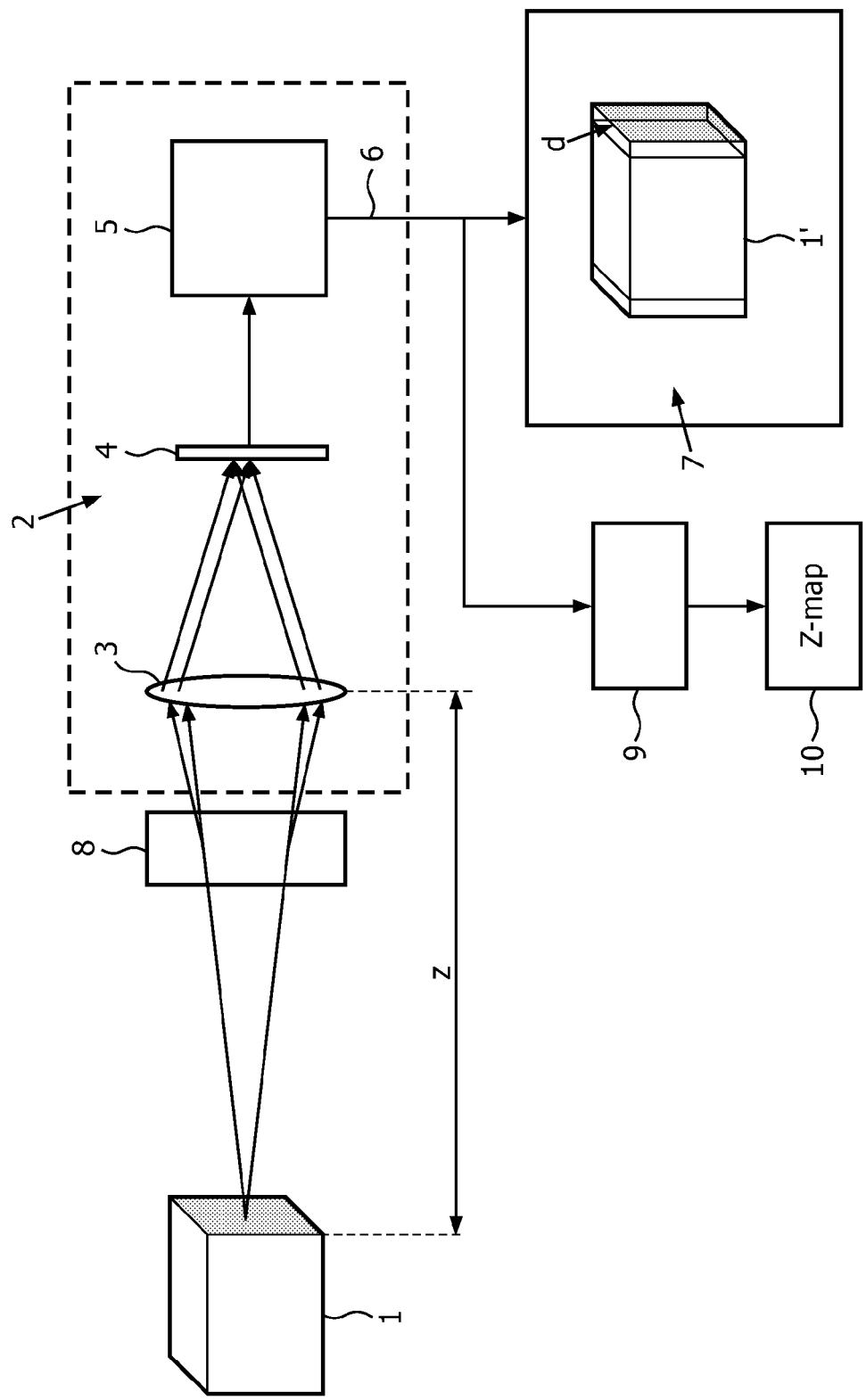
FIG. 2 illustrates the method, system and camera in accordance with the invention.

FIG. 2 schematically illustrates a system, method and camera to record image data in accordance with the invention.

In front of the lens, an optical device 8 is positioned. The optical device can be positioned at some distance from the camera or attached to the camera. The optical device creates two or more superimposed images on the sensor. On the display 7, one would see two or more constituting images, slightly shifted with respect to each other. The shift d is a measure for the distance z of the object to the lens. The constituting images are recorded simultaneously. The signal 6 of the compound image is lead to an analyzer 9 which analyzes the image to determine the distances d of objects in the compound image, and compute a z-map 10 for the image from the distances d. This analyzer can be a part of the system, device and camera to directly determine the z-map. Alternatively, the signal for the compound image can be sent to a separate analyzer to determine the z-map. For instance, the camera can record the image and the signal is sent via the internet to an analyzer associated with an internet site. The signal 6 can also first be stored on an electronic storage medium and thereafter be sent to an analyzer for analysis.

Figure 3:
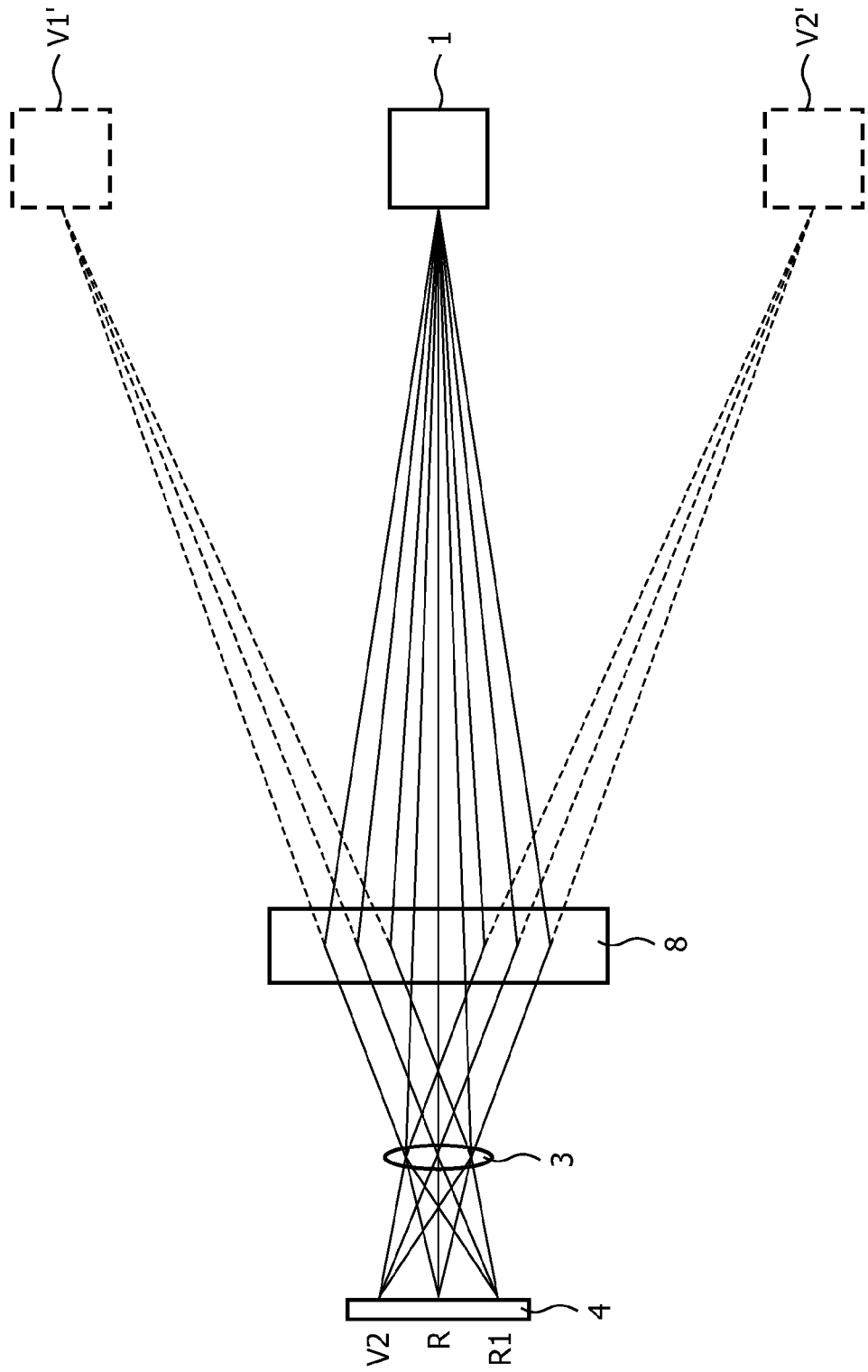
FIG. 3 illustrates an embodiment, showing the use of a grating in front of the lens.

FIG. 3 illustrates an embodiment of the invention in which an optical device 8, in this example a grating is positioned in front of the lens. Grating 8 creates, by diffraction, not just one direct image R, i.e. the usual standard image, on the sensor, but also a number of higher order diffracted images V1 and V2 on the sensor. The image as provided in the data thus comprises not just the direct image, but also two side images V1' and V2'. For the sake of simplicity these side images will be called "ghost images" V1 and V2 respectively. The distance d between the direct image R and the ghost images V1 and V2 can be expressed as a function of the wavelength of light and the distance of the object to the sensor. The direct image is below also called the real object and the ghost images the virtual objects.

Figure 4:
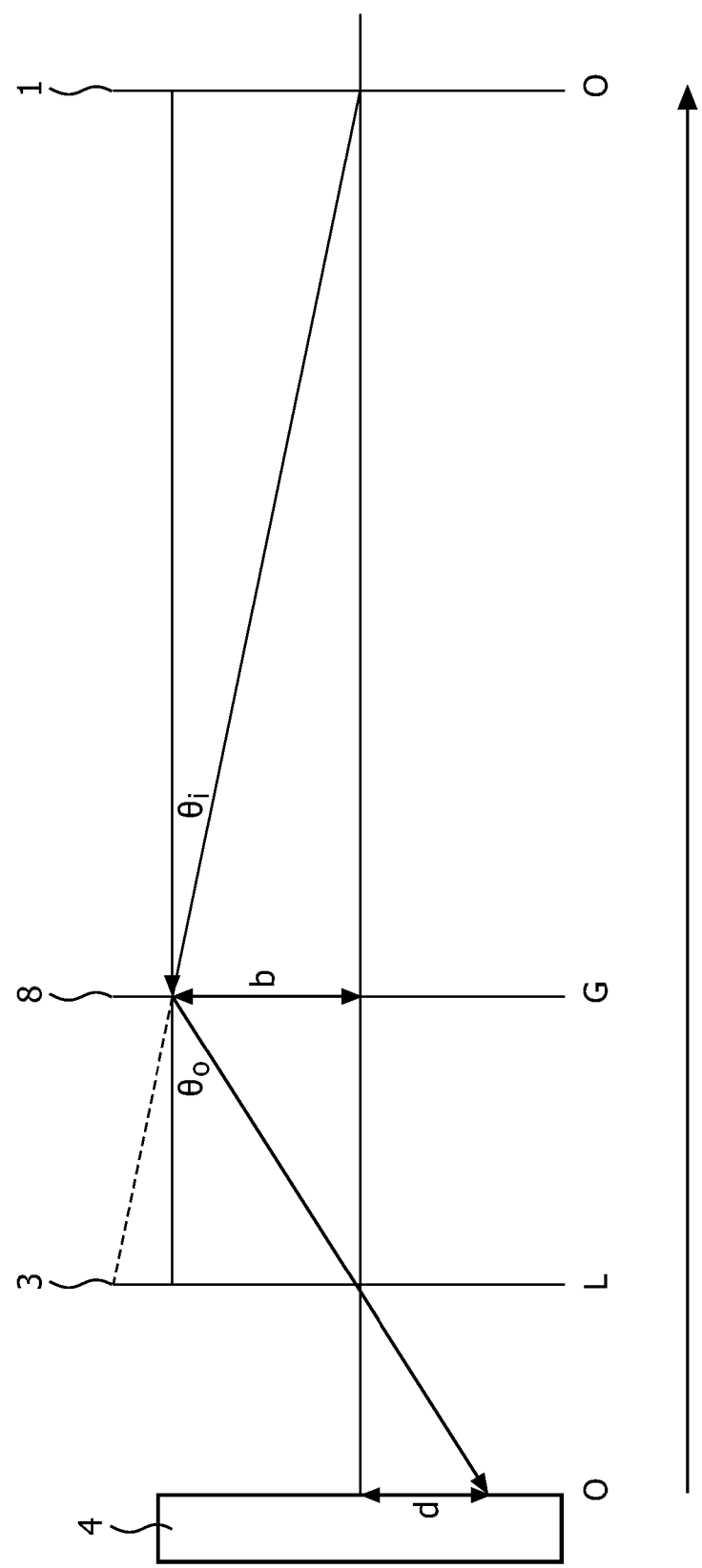
FIG. 4 illustrates the relation between grating spacing d, distance to the lens and the distance between constituting images in the compound image.

This is illustrated in FIG. 4 showing, schematically, the cardinal line of 1st diffraction image, resulting in the displacement d. The sensor 4 is at position 0 (zero), the lens 3 on position L, the grating 8 on position G, and the object 1 on object position O.

Having understood how the effect works qualitatively, one can now deduce quantitative relations. Starting from the schematic drawing in FIG. 4, one can relate the distance between the real object and the virtual object on the sensor (which we call the displacement d), with the distance b (between optical axis and grating deflection point):

$$d = \frac{L}{(G-L)} b$$

Furthermore, the change in angle at the grating can be described by the grating equation:

$$d_{grating}[\sin(\theta_i) + \sin(\theta_o)] = n\lambda$$

in which $d_{grating}$ is the periodicity of the grating, $\lambda$ the wavelength of the light and n=1 the diffraction order. When working with small angles, this can be approximated as:

$$\theta_i + \theta_o = \theta_{grating} = \frac{n\lambda}{d_{grating}}$$

One can now calculate b, as (in small angle approximation):

$$b = \theta_i(O-G) = \theta_0(G-L)$$
$$b = (\theta_{grating} - \theta_i)(G-L) = \left(\theta_{grating} - \frac{b}{(O-G)}\right)(G-L)$$

Isolating b out of this equation results in:

$$b = \frac{(O-G)(G-L)}{(O-L)} \theta_{grating}$$

Which formula can be used to calculate the displacement d:

$$d = L\theta_{grating} \frac{(O-G)}{(O-L)}$$

And inversely, the distance of the object O when we have measured the displacement d:

$$O = \frac{dL - GL\theta_{grating}}{d - L\theta_{grating}}$$

Figure 5:
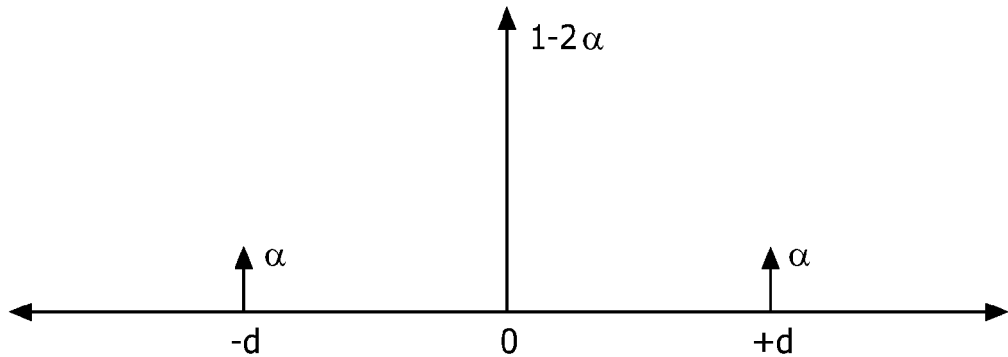
FIG. 5 illustrates intensities of diffraction patterns.

This embodiment is an example of a first type of optical device in which from one point of an object light goes into different directions. Since d is measured, L and G are known and $\theta_{grating}$ is known for n=1 and for a given wavelength, the distance O of the object can be calculated from the measured d. For simplicity, a grating with only −1, 0, +1 diffraction orders can be used; in more complex arrangements higher order diffractions orders may be used. Also, gratings can be made in which diffraction orders are emphasized for instance sending more intensity into the first order diffraction pattern. A grating with mainly −1, 0, 1 diffraction orders can for instance be obtained by a phase grating with a 50% duty cycle, and the diffraction fraction alpha is directly related to the etching depth. In this case, the image formation process can be seen as a simple convolution of the original image (without grating) with a point-spread function (PSF) that has a strong peak with intensity 1-2α in the middle, and weaker peaks with intensity α at specific positions that correspond to the diffraction orders, see FIG. 5. The strength of the sub-peaks, i.e. α, can be chosen as part of the grating design and only need to be measured once.

An incoming signal F(x) provides for a diffracted signal $$F'(x) = \text{ghost image left} + \text{direct image} + \text{ghost image right}$$
$$= \alpha F(x-d) + (1-2\alpha)F(x) + \alpha F(x+d)$$

This PSF can be mathematically written in the Z-domain (or Fourier space) as:

$$PSF_{grating} = \alpha Z^{-d} + (1-2\alpha) + \alpha Z^d$$

In order to get a depth-map from the captured compound image, one should estimate the displacement d for a part of the image and calculate with the displacement equation the corresponding object distance O.

There are various estimation methods known in literature, we have tried with success the following. One can estimate the local displacement d by finding the sub peaks in the correlation between an image window (defined by x-coordinates $x_w$ and y-coordinates $y_w$) and a d shifted window on both sides:

$$\hat{d}(x_w, y_w) = \underset{d\left[\underset{\text{in window}}{\sum_{\text{all pixels}}} [Img(x_w,y_w)*(Img(x_w-d,y_w)+Img(x_w+d,y_w)])\right]}{\operatorname{argmax}}$$

The correlation will be highest if the shift d equals the shift due to the diffraction. One has then found for the window the value for d.

As is generally known, such correlations work much better when DC is suppressed. This can be achieved by pre-filtering the image with a high-pass filter (for example the derivative filter [+1,−1]).

Now the depth of the object is known, one can try to undo the grating effect, by inverting the grating PSF, which can be approximated with the following FIR (Finite Impuls Response) filter, for small values of α, in the Z-domain:

$$PSF_{grating}^{inv} \approx \frac{1 - \alpha Z^{-d} - \alpha Z^d}{(1 - 2\alpha)}$$

One can also add a liquid focus/autofocus lens to the method. This has as advantage, that the defocus blur can be minimized, resulting in sharper PSF estimations.

Figure 6:
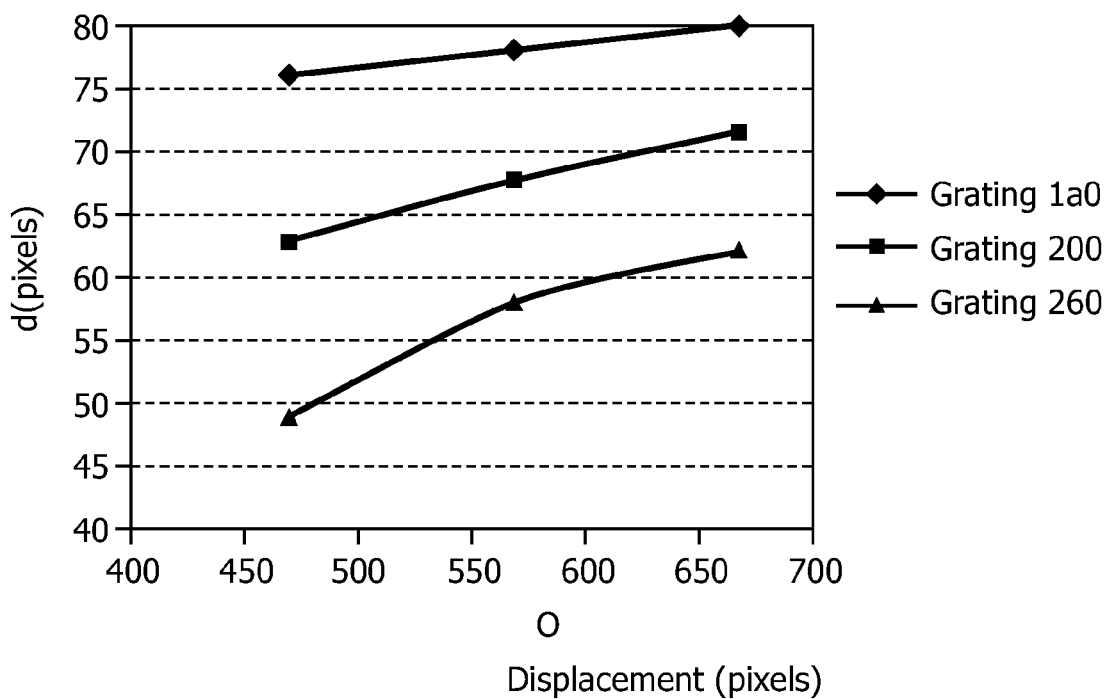
FIG. 6 illustrates a relation between pixel distance of corresponding images on the sensor and distance to the sensor.

FIG. 6 shows experimental results for measured displacement d in pixels as a function of the distance O for a lens distance of 250 mm and for a light with an approximate wavelength of 650 nm. Experimental results are given for various gratings where the number stands for the number of lines per mm.

The above illustrated embodiment uses a device in which, by means of a grating two or more (in this case three, a central image and two ghost images) images of the same object are made on the sensor. The distance d between the object is a measure for the distance O of the object to the sensor, and, with known lens (L) and grating (G) distances, also to said components.

These embodiments, although they work, do have a disadvantage; the diffraction of a grating is wavelength dependent. When use is made of light with a single wavelength λ, or almost a single wavelength, or a dominant wavelength, this is not a problem. Thus, for instance, this embodiment can be very effectively used in surveillance camera's surveying an area illuminated by artificial light of a certain known wavelength. In more sophisticated cases the analysis to find the distance d can use the colour information, which is available in the image. A rough first approximation of distance O could be made using the distance d independent on the colour content, followed by a more detailed determination using the colour content.

The grating could also be a grating based for instance on LCD cells where the grating can be switched on and off at will for instance by regulating the transparency of LCD cells. Alternatively one could use a phase modulating mask which is more efficient than amplitude modulation having a transparency of 1 everywhere, but where the modulation is in the optical refractive index n. Only 1 polarizer and the LC are then needed. Switching the grating on and off would allow a camera to be used as a 'normal' camera, when all cells are transparent providing a regular 2D image as well as a "3-D camera", by simulating a grating by blocking lines of cells.

In embodiments wherein the grating is switchable the device can be arranged to record a number of frames wherein some of the frames are without the use of the grating and some of the frames are with the use of the grating. For instance the grating could be operated such that per second 25 simple images interleaved with 25 compound images are recorded.

This opens a number of possibilities, for instance:

providing in the same signal both the compound image as well as the normal image. The normal images are then for instance sent to the display of the camera, so that the operator sees the 'normal image', while the compound images are stored and/or analysed.

Simplifying the analysis, the normal image frames form a good starting point for the analysis.

However, although in such embodiments a dynamic system is used, it remains essential that the compound images comprise several views recorded simultaneously. In this example there are three views: the centre view and two side views.

Figure 7:
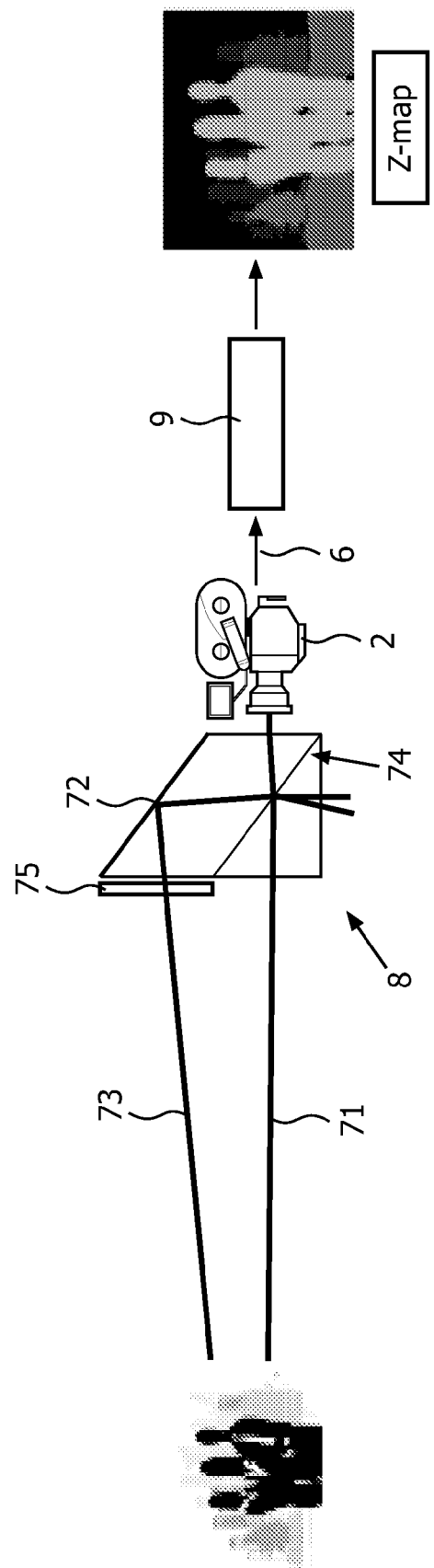
FIG. 7 illustrates a second embodiment in which an arrangement comprising a mirror and beam splitter is used.

FIG. 7 illustrates another embodiment of the invention. In this embodiment the optical device comprises a configuration comprising a mirror 72 and a beam-splitter 74. The direct view 71 is recorded through the beam splitter, the mirror 72 reflects a side view 73, which is then reflected by the beam splitter and also enters the lens of camera 2. A neutral density filter 75 is provided in front of the mirror in case the beam splitter is a 50%/50% beam splitter. In the description of this exemplary embodiment the first view is called the "direct view"; the second view is called the "side view". This is however not to be taken as a restriction; there are at least two views, wherein in this embodiment one of the views can be called a 'direct view'. In other embodiments both of the views could be side views, one slightly from the left and the other slightly from the right. Also, it is not a restriction that there be two views; more than two views could be simultaneously taken. Arrangements having a mirror and a beam splitter include combinations of these elements such as for instance a lateral displacement beam splitter. In this type of devices light comes from two different position separated by a base line into the same direction towards the sensor.

Figure 8:
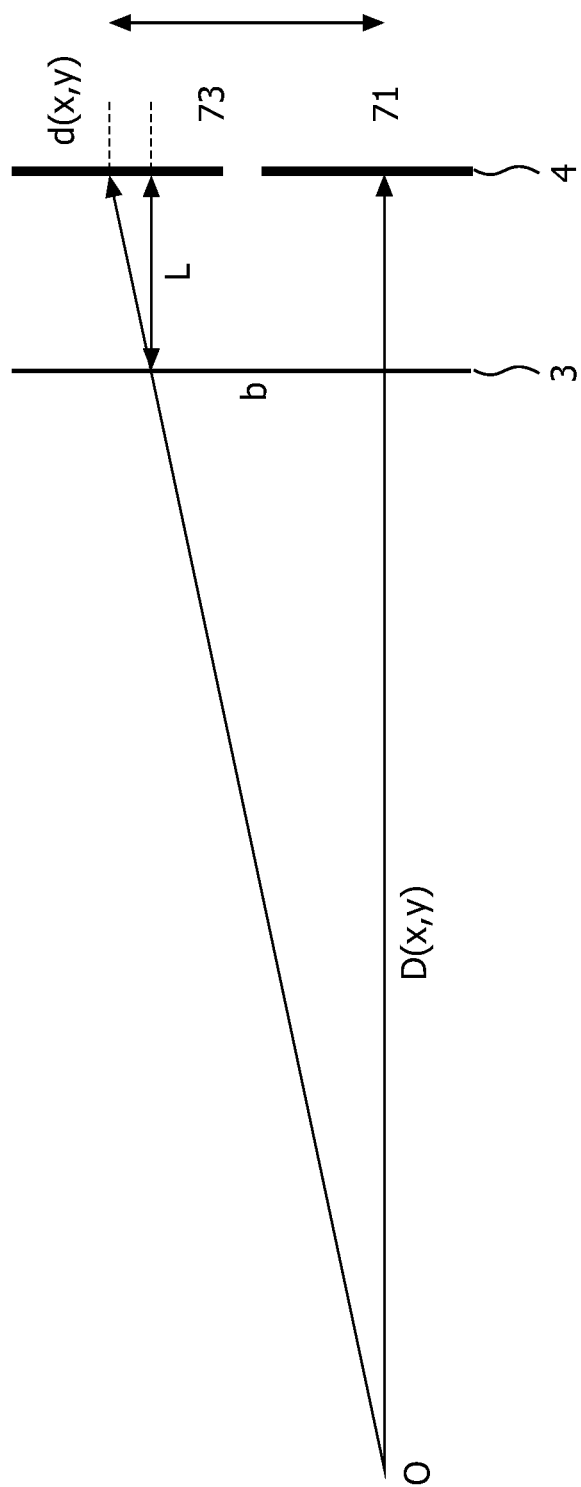
FIG. 8 illustrates the relation between pixel distance of corresponding images on the sensor and distance to the sensor.

The optical element preferably is a beam-splitter with asymmetric light intensity distribution, e.g. a 40%-60% or alternatively, 50%-50% beam splitter with a neutral density filter in front of the side view, see FIG. 1. The image acquired by the sensor 4 of camera 2 can be modelled as $$I_{sensor}(y, x) = (1 - \alpha) \cdot I_{direct}(y, x) + \alpha \cdot I_{side}(y, x)$$

$$= (1 - \alpha) \cdot I_{direct}(y, x) + \alpha \cdot I_{direct}(y, x + d(x, y))$$

where α<0.5 is parameter describing the contribution from the side view in the compound image $I_{sensor}(x,y)$, and d(x,y) is disparity (=distance on sensor of the corresponding parts of the two images) due to beam-splitter. The disparity d(x,y) is a function of distance D(x,y), towards the object and the parameters of the optical system such as base line band the distance L between the lens and the sensor in the camera, as is illustrated in FIG. 8.

$$d(x, y) = \frac{b \cdot L}{D(x, y)} = \frac{c_{optical}}{D(x, y)}$$

Therefore the depth estimate D(x,y) is equivalent to the estimate of disparity d(x,y) on the combined image $I_{sensor}$(x, y). It is to be noted that the relation between D and d is slightly different for this type of optical device than for the first type, as illustrated by the grating of FIG. 3, between O and d. The above relation is simpler and is not dependent on wavelength. This is advantageous.

Below we describe an iterative algorithm which finds the disparity map d(x,y) and the direct view $I_{direct}$(x,y) from the combined image $I_{sensor}$(x,y) by way of example and in addition to the possible algorithm described above.

The algorithm is iterative, in every iteration the direct image approximation $I_{out}$(x,y) and depth map approximation $d_{out}$(x,y) are computed from the combined image $I_{sensor}$(x,y), and the previous values of the direct image approximation I(x,y) and the depth map approximation d(x,y)

$$(I_{out}(x,y), d_{out}(x,y)) = \Phi(I(x,y), d(x,y))$$

Figure 9:
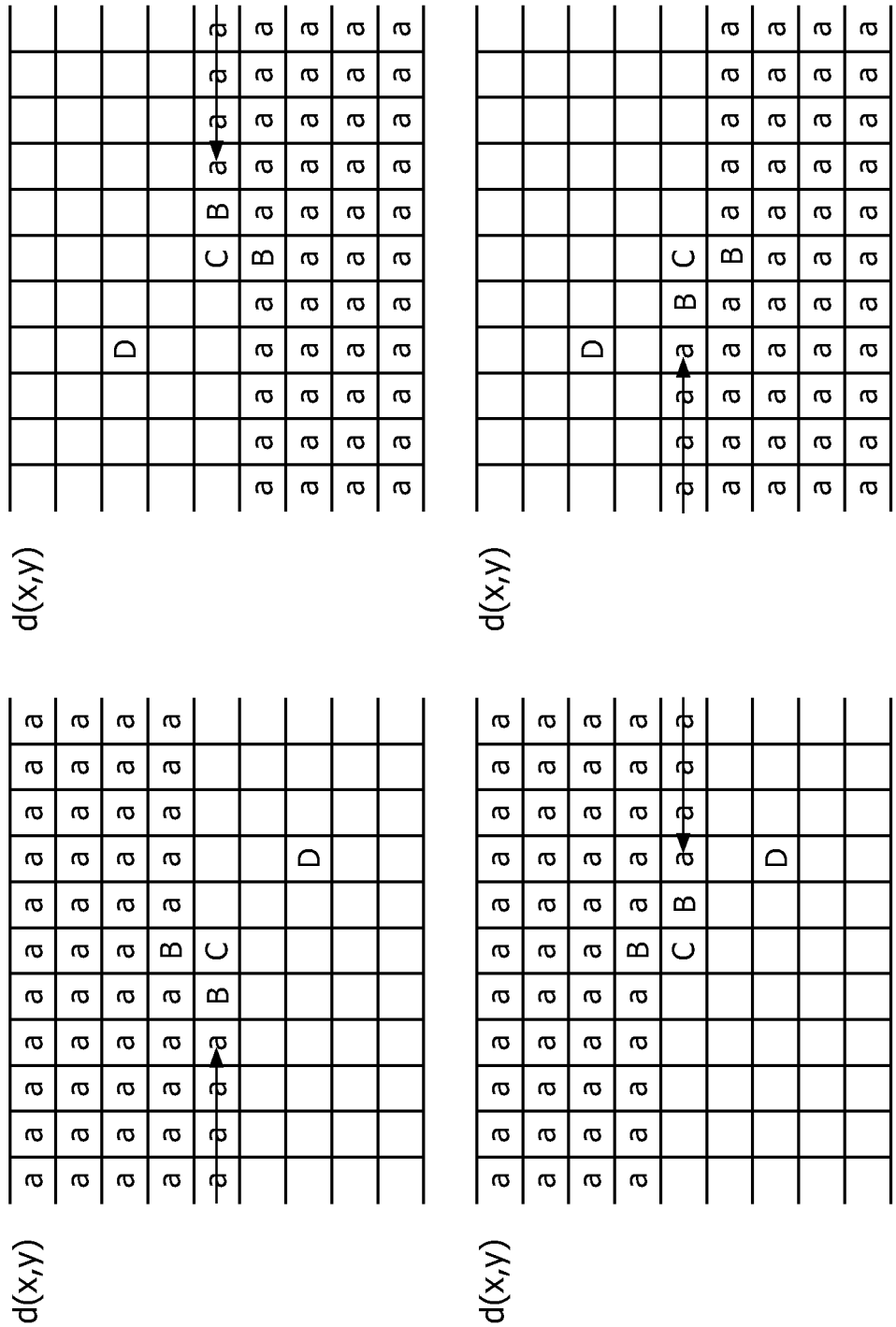
FIG. 9 illustrates a method for determining from the compound image spatial distances between corresponding objects.

The updated approximations are initialized as $I_{out}$(x,y)=I(x,y) and $d_{out}$(x,y)=d(x,y) are then they are updated on block basis. The block dimensions $\Delta_x$, $\Delta_y$ are parameters of the algorithm. The $I_{out}$(x,y) and $d_{out}$(x,y) are then updated according to 3D recursive search algorithm 3DRS. According to 3DRS we process sequentially all image blocks and for every block we evaluate several depth candidates. The candidate values are the mixture of values of neighbouring blocks and the random updates. The position of neighbouring blocks providing the candidates can depend on the scanning direction on the block grid, for example see FIG. 9 showing example position of blocks providing depth candidates. In FIG. 9 already processed blocks are given the letter a, the current block the letter C, "spatial" neighbouring blocks the letter B and "temporal" neighbouring blocks the letter D. The arrows indicate the processing direction.

The random candidates can be obtained by addition of random updates to the values of other candidates. Each candidate is evaluated and then the best is selected providing the values of $d_{out}$(x,y) at current block. The evaluation process consists of three steps: First, the values of $d_{out}$(x,y) at the current block are changed to the value of the evaluated candidate. Second, given the depth map, the combined image $I_{sensor}$(x,y) is locally (partially) de-convolved. The (partially) de-convolution can be done in many different ways. For example, one can use several iterations of the Gauss-Seidel de-convolution method in the neighbourhood of the current block:

$$I_{out}(x, y) = \frac{(I_{sensor}(x, y) - \alpha \cdot I_{out}(x + d(x, y), y))}{(1 - \alpha)}$$

At the third step the quality of $I_{out}$(x,y) in the neighbourhood of the current block is evaluated by means of a no-reference quality metric. For this purpose one can use, for example, $$Q(I_{out}(x, y)) = \min_{(x,y) \in B} I_{out}(x, y) - \max_{(x,y) \in B} I_{out}(x, y),$$

where B is some neighbourhood of the current block. The candidate which maximizes the quality metric is selected as the best providing the values of $d_{out}$(x,y) at current block.

Note that after each evaluation of candidate we restore the values of $I_{out}$(x,y) to initial, and after all evaluations, when $d_{out}$(x,y) is updated, we (partially) de-convolve $I_{out}$(x,y) in the neighbourhood of the current block.

The above described method of depth sensing has a number of parameters which can be optimized for the optimal performance.

Figure 10:
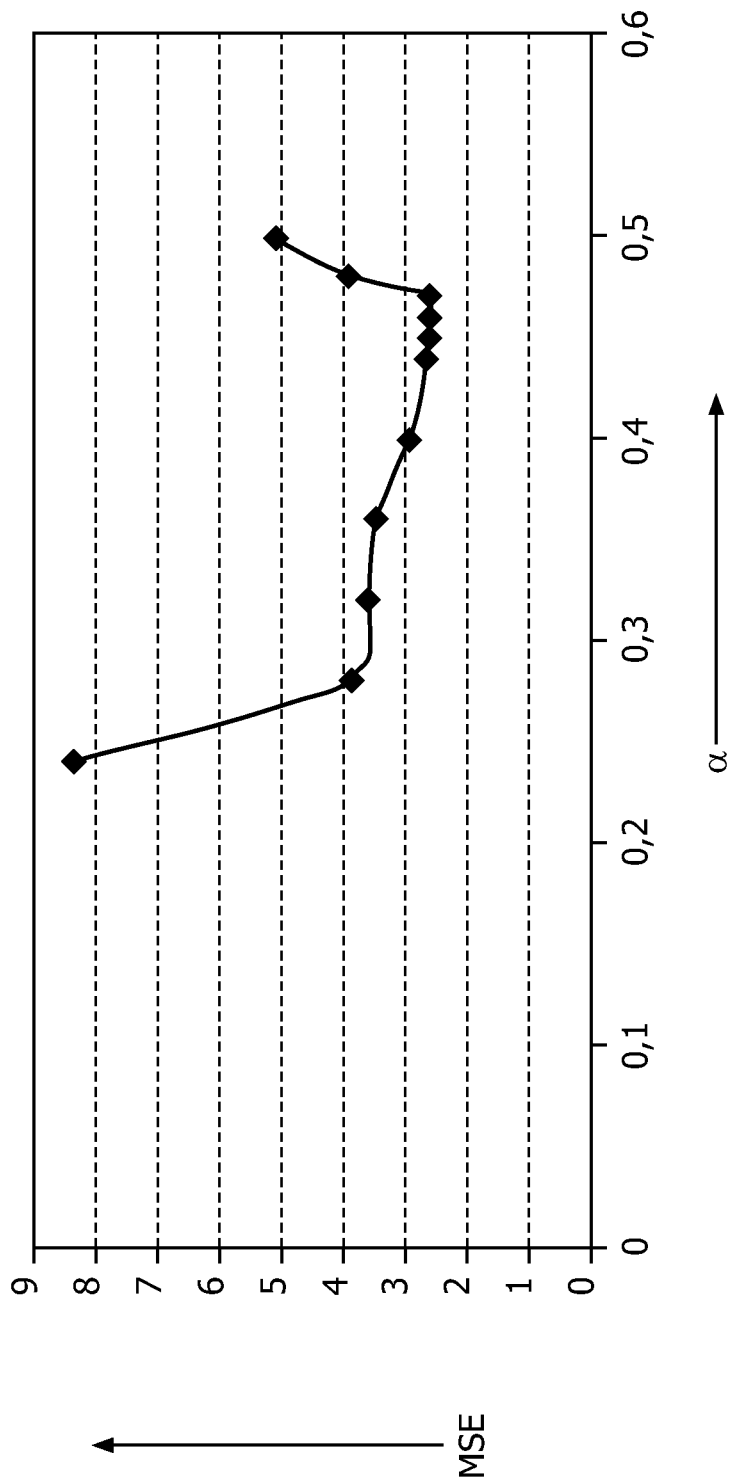
FIG. 10 illustrates a measure for the quality of determined distances.

First of all we found that the results are dependent on the mix of intensities, i.e. the value for $\alpha$ and very good results can be obtained with a between 0.28 and 0.49, or between 0.51 and 0.72, for instance $\alpha \approx 0.45$. This means that one of the images, either $I_{direct}$, or $I_{side}$ has an intensity between 4 percent to 133% percent higher than the intensity of the other image. FIG. 10 illustrates the effect. The horizontal axis gives the value for a, the vertical error the mean square error (MSE) in the calculated disparity in respect of true values. A clear minimum is visible around $\alpha$=0.45, in particular between $\alpha$=0.42 and 0.48. Preferably the direct view image has a higher intensity than the side view. For some purposes the direct view can best be reconstructed, in which case it is advantageous to have most of the intensity in the direct view. When the constituting images are of equal intensity it becomes very hard to distinguish the two images and the method becomes very complicated. When one of the image is very weak compared to the other, this images becomes difficult to distinguish.

The dependence of the depth estimation quality on the contribution factor from the side view (alpha) was investigated as follows. The image acquired with the beam splitter for a given depth map was simulated. Then we used the described deconvolution algorithm to evaluate the depth map from the simulated compound image. The mean square error between the used and the evaluated depth maps was taken as the quality measure. In FIG. 10, the dependence of the quality measure from alpha is given. FIG. 10 shows that the best results can be achieved with alpha in [0.28,0.48] which corresponds to ratios 1.07-2.57 (=(1−alpha)/alpha) between the intensities of the direct and side views. The minimum is with alpha between 0.42 and 0.47.

Secondly, since the algorithm assumes several iterations one can choose different $\Delta_x$, $\Delta_y$ for each iteration. Typically the large values of $\Delta_x$, $\Delta_y$ improve convergence, while the smaller values improve spatial resolution of the approximated depth map. In our evaluation we obtained the best results with $\Delta_x$, $\Delta_y$ decreasing at each iteration, e.g. for image with 800× 576 pixels we used $\Delta_x=\Delta_y$=16 in the first iteration, $\Delta_x=\Delta_y$=8 in the second iteration, and $\Delta_x=\Delta_y$=4 in the third iteration. Such an embodiment combines a fast convergence of results with a high spatial resolution.

As in the embodiment with the grating the neutral density filter can be time switchable or even time modulated, to provide the possibility of dual purpose use, i.e. as a normal 2D camera and a 3D camera, depending on whether the neutral filter in on or off. Also sequences of frames wherein a number of frames comprise a non-compound image presenting only a direct view (or side view) and a number of frames comprise compound images.

The neutral density filter could also have a spatial variation. This would allow the side view to be more easily, by means of spatial filtering, distinguishable from the direct view, which can be an input for the analysis, allowing a faster and/or more accurate determination of the disparities. However, it is essential, even though some of the images are compound and some are single, that the constituting images of the compounded images are taken simultaneously. The simultaneous recording of the constituting images eliminates problems with movement of objects. In this respect it is to be noted that typically the distance measured in pixels between an object in left and right view is several tens of pixels. The difference in this distance is a measure of depth, and thus typically in the lower tens of pixels. Movement of objects between frames can provide for similar distance in pixels.

Thus, comparing a left and right image taken at different times, i.e. not superimposed, even if only a frame apart, complicates matters. For moving objects one would have to know the motion of objects. It requires several frames to acquire an accurate measurement of motion of objects. Only when the movement is known is it possible to separate the measured distance for a moving object into a distance in pixels due to parallax, from which the depth can be calculated, and a distance in pixels due to movement, which has no direct relation to depth. To get an accurate depth measurement for moving objects data of a relatively large number of images must be analyzed. Usually some further assumptions on the motion have to be made, for instance that it is more or less the same or only linearly changing between frames. All this leads to complicated calculation and even so any inaccuracy in determination of the movement leads to inaccuracy in determination of parallax and thus of depth. Particular problems arise when the moving objects comprise repetitive patterns. If the object happens to move such that between the frames the repetitive patterns shift one step, it becomes very difficult, if not impossible, to provide a motion estimation with any accuracy. By recording the constituting images of the compound image simultaneously any problem with motion is eliminated. A further problem arises for objects that move away from or towards the camera. It is very difficult to accurately estimate such movements.

The fact that in embodiments, apart from compound images, single images may be taken does not defer from this fact. The single images (centre, left or right images) allow a check on results, which allows more accurate determination of depth and/or to distract more easily one or both of the constituting images from the compound image.

The viewer of the camera, in embodiments, displays not the compound image, but a non-compound image. For a human person it is disturbing to see a compound image. In embodiments the camera can also directly display the depth image, visualizing the z-map, or a vision that combines both parameters.

The image can be taken in visible light, but equally well in infra-red light. For instance an infrared camera can be provided with an optical device to create a double compound image, wherein the software creates from the double image a non-compound image, wherein the image intensity stands for heat, and furthermore a color code is used to the objects in dependence on the distance to the sensor. This will enable an observer using night goggles not just to see the persons and objects as they move in the dark, but also to immediately get an idea of how far away these persons or objects are from the observer.

In short the invention can be described as follows:

A camera and camera system is provided with an optical device (8). The optical device creates simultaneously two or more images of object on a sensor (4) to form a compound image. The distance d between the constituting images of objects in the compound image is dependent on the distance Z to the camera. The compound image is analysed (9), e.g. deconvolved to determine the distances d between the double images. These distances are then converted into a depth map (10).

The invention also relates to computer programs comprising program code means for performing a method according to the invention when said program is run on a computer, as well as computer program product comprising program code means stored on a computer readable medium for performing a method according to the invention.

In the claims, any reference signs placed between parentheses shall not be construed as limiting the claim.

The word "comprising" does not exclude the presence of other elements or steps than those listed in a claim. The invention may be implemented by any combination of features of various different preferred embodiments as described above.

A camera is any device for making images. It could be a part of a device also used for other purposes such as communication, or attached to, integrated in or cooperating with such a communication device.

The invention claimed is:

1. A method for recording image comprising the steps of:
   positioning a lens in front of an image sensor for recording an image;
   positioning an optical device in front of the lens;
   positioning an object in front of the optical device; and
   causing the image sensor to generate an output signal corresponding to images of the object imaged on the image sensor,
   wherein the optical device produces a compound image on the image sensor, the compound image comprising two or more superimposed, simultaneously taken, images of the object,
   wherein a spatial distance between corresponding objects of the two or more superimposed images on the image sensor in the compound image is dependent on a distance of the object from the lens,
   wherein the two or more superimposed images are imaged on the image sensor by the lens,
   and wherein the compound image is analyzed to determine the spatial distance between corresponding objects of the two or more superimposed images in the compound image on the image sensor
   wherein, in an iterative process, in every iteration, a direct image approximation $I_{out}(x,y)$ and a depth map approximation $d_{out}(x,y)$ are computed from the compound image $I_{sensor}(x,y)$, and the previous values of the direct image approximation $I(x,y)$ from the depth map approximation $d(x,y)$,
   and wherein a first view is recorded with a first intensity and a second view is recorded with a second intensity, wherein a ratio between said first and said second intensities is between 1.04 and 2.57 or between 1/2.57 and 1/1.04.

2. The method as claimed in claim 1, wherein, for pixels within an image window, in correlation are calculated for a shift of an image window.

3. The method as claimed in claim 1, wherein the compound image is formed by diffraction, the optical device comprising a grating for effecting said diffraction.

4. The method as claimed in claim 1, wherein the compound image is formed by shifting of views, the optical device comprising a mirror and a beam splitter for effecting said shifting of views.

5. The method as claimed in claim 1, wherein the optical device is arranged to be switchable between a first operative state in which a single image is formed and a second operative state in which the compound image is formed.

6. A system for recording image data comprising:
an image sensor for producing an output signal corresponding to images imaged in the image sensor;
a lens positioned in front of the image sensor; and
an optical device for producing a compound image on the image sensor comprising two or more superimposed, simultaneously taken, images of an object,
wherein a spatial distance between corresponding objects of the two or more superimposed images on the image sensor in the compound image is dependent on distance of said object from the lens,
wherein, in an iterative process, in every iteration, a direct image approximation $I_{out}(x,y)$ and a depth map approximation $d_{out}(x,y)$ are computed from the compound image $I_{sensor}(x,y)$, and the previous values of the direct image approximation $I(x,y)$ from the depth map approximation $d(x,y)$,
and wherein a first view is recorded with a first intensity and a second view is recorded with a second intensity, wherein a ratio between said first and said second intensities is between 1.04 and 2.57 or between 1/2.57 and 1/1.04.

7. The system as claimed in claim 6, wherein the optical device is switchable between a first operative state in which a single image is produced and a second operative state in which the compound image is produced.

8. The system as claimed in claim 6, wherein the system further comprises an analyzer for analyzing an output signal of the image sensor corresponding to the compound image to determine the spatial distance between corresponding objects of the two or more superimposed images in the compound image on the image sensor.

9. The system as claimed in claim 6, wherein the optical device comprises a grating.

10. The system as claimed in claim 6, wherein the optical device comprises a mirror and a beam splitter.

11. The system as claimed in claim 8, wherein said system further comprises a display in which a non-compound image and/or an estimated depth map and/or an image providing image and depth information is displayed on the display.

12. A non-transitory computer-readable storage medium encoded with a computer program comprising program code which, when run on a computer, causes the computer to perform the method as claimed in claim 1.

* * * * *